(12) United States Patent
Bruins et al.

(10) Patent No.: US 6,308,148 B1
(45) Date of Patent: *Oct. 23, 2001

(54) NETWORK FLOW DATA EXPORT

(75) Inventors: Barry L. Bruins, Los Altos; Darren R. Kerr, Carlsbad, both of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,438

(22) Filed: Dec. 20, 1996

Related U.S. Application Data

(63) Continuation-in-part of application No. 08/655,429, filed on May 28, 1996.

(51) Int. Cl.[7] .................................................. G06F 3/00
(52) U.S. Cl. ........................ 703/27; 703/26; 370/401; 370/408; 707/104
(58) Field of Search .............................. 395/500, 200.54, 395/200.63, 200.64; 370/401, 411, 353, 355, 408; 703/26, 27, 22; 707/104

(56) References Cited

U.S. PATENT DOCUMENTS

| Re. 33,900 | 4/1992 | Howson .................................. 370/105 |
| 4,131,767 | 12/1978 | Weinstein ............................ 179/170.2 |

(List continued on next page.)

FOREIGN PATENT DOCUMENTS

| 0 384 758 | 2/1990 | (EP) ................................. H04L/12/56 |
| 0 431 751 A1 | 11/1990 | (EP) ................................. H04L/12/46 |
| WO 95/20850 | 8/1995 | (WO) ................................ H04L/12/56 |

OTHER PUBLICATIONS

Girish et al., Trading Packet Headers for Packet Processing, IEEE, 1996, pp. 141–152.*

Newman et al., "Flow Labelled IP: A Connectionless Approach to ATM," IEEE, 1996, pp. 1251–1260.*

(List continued on next page.)

*Primary Examiner*—Kevin J. Teska
*Assistant Examiner*—Thai Phan
(74) *Attorney, Agent, or Firm*—Hickman Palermo Truong & Becker LLP; Christopher J. Palermo

(57) ABSTRACT

The invention provides a system for collecting, exporting and using data relating to message flows responsive to message flow patterns in a flow switching network. A router collects and aggregates flow information using a variety of criteria, including (1) ranges of addresses for source and destination, (2) information about packets in the flow, including number and frequency of packets in the flow, size of packets in the flow (total size and distribution), (3) protocol used for the flow, including for example whether the flow uses electronic mail protocol, file transfer protocol, hypertext transfer protocol, real-time audiovisual data transmission protocol, or some other protocol, (4) other administrative criteria which may be pertinent to the flow, including for example initiation time or duration of the flow, and (5) possible aggregations or combinations of these criteria. The router provides the aggregated information to one or more filters at an output port. Each filter selects only a subset of the total set of flows; filters may be combined to create compound filters. Filters may be coupled to aggregators, which further aggregate flow data and may store flow data for use by application programs. Application programs may identify useful information in the flow data and may either (1) present that data to an operator for review, or (2) use that data to adjust features or parameters of the network. The router may also collect information so that flows which are improper or otherwise unusual can be traced to particular source and destination devices.

17 Claims, 1 Drawing Sheet

U.S. PATENT DOCUMENTS

| | | | |
|---|---|---|---|
| 4,161,719 | 7/1979 | Parikh et al. | 340/147 SY |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |
| 4,437,087 | 3/1984 | Petr | 340/347 DD |
| 4,438,511 | 3/1984 | Baran | 370/19 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |
| 4,499,576 | 2/1985 | Fraser | 370/60 |
| 4,506,358 | 3/1985 | Montgomery | 370/60 |
| 4,507,760 | 3/1985 | Fraser | 365/221 |
| 4,532,626 | 7/1985 | Flores et al. | 370/85 |
| 4,644,532 | 2/1987 | George et al. | 370/94 |
| 4,646,287 | 2/1987 | Larson et al. | 370/60 |
| 4,677,423 | 6/1987 | Benvenuto et al. | 340/347 DD |
| 4,679,189 | 7/1987 | Olson et al. | 370/60 |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,750,136 | 6/1988 | Arpin et al. | 364/514 |
| 4,757,495 | 7/1988 | Decker et al. | 370/76 |
| 4,763,191 | 8/1988 | Gordon et al. | 358/86 |
| 4,769,810 | 9/1988 | Eckberg, Jr. et al. | 370/60 |
| 4,769,811 | 9/1988 | Eckberg, Jr. et al. | 370/60 |
| 4,771,425 | 9/1988 | Baran et al. | 370/85 |
| 4,819,228 | 4/1989 | Baran et al. | 370/85 |
| 4,827,411 | 5/1989 | Arrowood et al. | 364/300 |
| 4,833,706 | 5/1989 | Hughes-Hartogs | 379/98 |
| 4,835,737 | 5/1989 | Herrig et al. | 364/900 |
| 4,879,551 | 11/1989 | Georgiou et al. | 340/825.87 |
| 4,893,306 | 1/1990 | Chao et al. | 340/94.2 |
| 4,903,261 | 2/1990 | Baran et al. | 370/94.2 |
| 4,922,486 | 5/1990 | Lidinsky et al. | 370/60 |
| 4,933,937 | 6/1990 | Konishi | 370/85.13 |
| 4,960,310 | 10/1990 | Cushing | 350/1.7 |
| 4,962,497 | 10/1990 | Ferenc et al. | 370/60.1 |
| 4,962,532 | 10/1990 | Kasiraj et al. | 380/25 |
| 4,965,772 | 10/1990 | Daniel et al. | 364/900 |
| 4,970,678 | 11/1990 | Sladowski et al. | 364/900 |
| 4,980,897 | 12/1990 | Decker et al. | 375/38 |
| 4,991,169 | 2/1991 | Davis et al. | 370/77 |
| 5,003,595 | 3/1991 | Collins et al. | 380/25 |
| 5,014,265 | 5/1991 | Hahne et al. | 370/60 |
| 5,020,058 | 5/1991 | Holden et al. | 370/109 |
| 5,033,076 | 7/1991 | Jones et al. | 379/67 |
| 5,054,034 | 10/1991 | Hughes-Hartogs | 375/8 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,095,480 | 3/1992 | Fenner | 370/94.1 |
| 5,115,431 | 5/1992 | Williams et al. | 370/94.1 |
| 5,128,945 | 7/1992 | Enns et al. | 371/37.1 |
| 5,136,580 | 8/1992 | Braff et al. | 370/94.1 |
| 5,199,049 | 3/1993 | Wilson | 375/104 |
| 5,206,886 | 4/1993 | Bingham | 375/97 |
| 5,208,811 | 5/1993 | Kashio et al. | 370/94.1 |
| 5,212,686 | 5/1993 | Joy et al. | 370/60 |
| 5,224,099 | 6/1993 | Corbalis et al. | 370/94.2 |
| 5,226,120 | 7/1993 | Brown et al. | 370/94.2 |
| 5,228,062 | 7/1993 | Bingham | 375/97 |
| 5,229,994 | 7/1993 | Balzano et al. | 370/85.13 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/82 |
| 5,249,178 | 9/1993 | Kurano et al. | 370/60 |
| 5,249,292 | * 9/1993 | Chiappa | 395/650 |
| 5,255,291 | 10/1993 | Holden et al. | 375/111 |
| 5,260,933 | 11/1993 | Rouse | 370/14 |
| 5,260,978 | 11/1993 | Fleischer et al. | 375/106 |
| 5,268,592 | 12/1993 | Bellamy et al. | 307/43 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/13 |
| 5,280,480 | 1/1994 | Pitt et al. | 370/85.13 |
| 5,280,500 | 1/1994 | Mazzola et al. | 375/17 |
| 5,283,783 | 2/1994 | Nguyen et al. | 370/16.1 |
| 5,287,103 | 2/1994 | Kasprzyk t al. | 340/825.52 |
| 5,287,453 | 2/1994 | Roberts | 395/200 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,319,644 | 6/1994 | Liang | 370/85.5 |
| 5,327,421 | 7/1994 | Hiller et al. | 370/60.1 |
| 5,331,637 | 7/1994 | Francis et al. | 370/54 |
| 5,345,445 | 9/1994 | Hiller et al. | 370/60.1 |
| 5,345,446 | 9/1994 | Hiller et al. | 370/60.1 |
| 5,359,592 | 10/1994 | Corbalis et al. | 370/17 |
| 5,361,250 | 11/1994 | Nguyen et al. | 370/16.1 |
| 5,361,256 | 11/1994 | Doeringer et al. | 370/60 |
| 5,361,259 | 11/1994 | Hunt et al. | 370/84 |
| 5,365,524 | 11/1994 | Hiller et al. | 370/94.2 |
| 5,367,517 | 11/1994 | Cidon et al. | 370/54 |
| 5,371,852 | 12/1994 | Attanasio et al. | 395/200 |
| 5,386,567 | 1/1995 | Lien et al. | 395/700 |
| 5,390,170 | 2/1995 | Sawant et al. | 370/58.1 |
| 5,390,175 | 2/1995 | Hiller et al. | 370/60 |
| 5,394,394 | 2/1995 | Crowther et al. | 370/60 |
| 5,394,402 | 2/1995 | Ross | 370/94.1 |
| 5,400,325 | 3/1995 | Chatwani et al. | 370/60.1 |
| 5,408,469 | 4/1995 | Opher et al. | 370/60.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/60.1 |
| 5,423,002 | 6/1995 | Hart | 395/200 |
| 5,426,636 | 6/1995 | Hiller et al. | 370/60.1 |
| 5,428,607 | 6/1995 | Hiller et al. | 370/60.1 |
| 5,430,715 | 7/1995 | Corbalis et al. | 370/54 |
| 5,430,729 | 7/1995 | Rahnema | 370/941 |
| 5,442,457 | 8/1995 | Najafi | 385/400 |
| 5,442,630 | 8/1995 | Gagliardi et al. | 370/85.13 |
| 5,452,297 | 9/1995 | Hiller et al. | 370/60.1 |
| 5,473,599 | 12/1995 | Li et al. | 370/16 |
| 5,473,607 | 12/1995 | Hausman et al. | 370/85.13 |
| 5,477,541 | 12/1995 | White et al. | 370/94.1 |
| 5,485,455 | 1/1996 | Dobbins et al. | 370/60 |
| 5,490,140 | 2/1996 | Abensour et al. | 370/60.1 |
| 5,490,258 | 2/1996 | Fenner | 395/401 |
| 5,491,687 | 2/1996 | Christensen et al. | 370/17 |
| 5,491,804 | 2/1996 | Heath et al. | 395/275 |
| 5,509,006 | 4/1996 | Wilford et al. | 370/60 |
| 5,519,704 | 5/1996 | Farinacci et al. | 370/85.13 |
| 5,526,489 | 6/1996 | Nilakantan et al. | 395/200.02 |
| 5,530,963 | 6/1996 | Moore et al. | 395/200.15 |
| 5,535,195 | 7/1996 | Lee | 370/54 |
| 5,539,734 | 7/1996 | Burwell et al. | 370/60 |
| 5,541,911 | * 7/1996 | Nilakantan et al. | 370/13 |
| 5,546,370 | 8/1996 | Ishikawa | 369/77.2 |
| 5,555,244 | 9/1996 | Gupta et al. | 370/60 |
| 5,561,669 | 10/1996 | Lenney et al. | 370/60.1 |
| 5,583,862 | 12/1996 | Callon | 370/397 |

| | | | |
|---|---|---|---|
| 5,592,470 | 1/1997 | Rudrapatna et al. | 370/320 |
| 5,598,581 | 1/1997 | Daines et al. | 395/872 |
| 5,600,798 | 2/1997 | Cherukuri et al. | 395/200.13 |
| 5,604,868 | 2/1997 | Komine et al. | 395/200 |
| 5,617,417 | 4/1997 | Sathe et al. | 370/394 |
| 5,617,421 | 4/1997 | Chin et al. | 370/402 |
| 5,621,720 * | 4/1997 | Bronte et al. | 370/13 |
| 5,630,125 | 5/1997 | Zellweger | 395/614 |
| 5,631,908 | 5/1997 | Saxe | 370/235 |
| 5,632,021 | 5/1997 | Jennings et al. | 395/309 |
| 5,634,010 | 5/1997 | Ciscon et al. | 395/200 |
| 5,644,718 | 7/1997 | Belove et al. | 395/200 |
| 5,666,353 | 9/1997 | Klausmeier et al. | 370/230 |
| 5,673,265 | 9/1997 | Gupta et al. | 370/432 |
| 5,678,006 | 10/1997 | Valizadeh et al. | 395/200 |
| 5,680,116 | 10/1997 | Hashimoto et al. | 340/827 |
| 5,684,797 | 11/1997 | Aznar et al. | 370/390 |
| 5,687,324 | 11/1997 | Green et al. | 395/250 |
| 5,689,506 | 11/1997 | Chiussi et al. | 370/388 |
| 5,691,984 * | 11/1997 | Gardner et al. | 370/401 |
| 5,724,351 | 3/1998 | Chao et al. | 370/395 |
| 5,742,760 * | 4/1998 | Picazo, Jr. et al. | 395/200.02 |
| 5,748,186 | 5/1998 | Raman | 345/302 |
| 5,754,547 | 5/1998 | Nakazawa | 370/401 |
| 5,802,054 * | 9/1998 | Bellenger et al. | 370/401 |
| 5,835,710 | 11/1998 | Nagami et al. | 395/200.8 |
| 5,854,903 | 12/1998 | Morrison et al. | 395/200.79 |
| 5,856,981 | 1/1999 | Voelker | 371/20.1 |
| 5,898,686 | 4/1999 | Virgile | 370/381 |
| 5,903,559 * | 5/1999 | Acharya et al. | 370/355 |
| 6,091,725 * | 7/2000 | Cheriton et al. | 370/392 |

OTHER PUBLICATIONS

Stallings, William, "Data and Computer Communications", pp. 329–333, Prentice Hall, Upper Saddle River, New Jersey.

Chowdhury, et al., "Alternative Banddwidth Allocation Algorithms for Packet Video in ATM Networks", 1992, IEEE Infocom 92, pp. 1061–1068.

Zhang, et al., "Rate–Controlled Static–Priority Queueing", 1993, IEEE, pp. 227–236.

Doeringer, et al., "Routing on Longest–Matching Prefixes", IEEE ACM Transactions on Networking, Feb. 1, 1996, vol. 4, No. 1, pp. 86–97.

IBM, "Method and Apparatus for the Statistical Multiplexing of Voice, Data, and Image Signals", Nov., 1992, IBM Technical Data Bulletin n6 11–92, pp. 409–411.

Esaki, et al., "Datagram Delivery in an ATM–Internet," IEICE Transactions on Communications vol. E77–B, No. 3, (1994) Mar., Tokyo, Japan.

* cited by examiner

NETWORK FLOW DATA EXPORT

CROSS-REFERENCE TO RELATED APPLICATION

This application is a continuation-in-part of U.S. patent application Ser. No. 08/655,429, "Network Flow Switching and Flow Data Export", filed May 28, 1996, in the name of the same inventors, assigned to the same assignee, hereby incorporated by reference as if fully set forth herein, and referred to herein as the "network flow switching disclosure". Terms defined in the network flow switching disclosure have the same meanings in the present application.

BACKGROUND OF THE INVENTION

1. Field of the Invention

This invention relates to techniques for exporting and using data relating to flows in a flow switching network and responsive to message flow patterns.

2. Related Art

In computer networks, it is commonly desirable to determine, collect, process, and possibly display information relating to use of the network, including information which could be used by network administrators, routing devices, service providers, and users. This information could be of a variety of types, such as for packets transmitted in the network—their source or destination, number, frequency, size, protocol type, priority, or other administrative information such as security classifications or accounting information. This information could also be aggregated by a variety of categories—for the entire network or subnetworks thereof, for groups of sources or destinations, or for particular types of packets (such as particular size, protocol type, priority, security classifications, or accounting information).

However, one problem which has arisen in the art is that, in many computer networks, the number of packets transmitted in the network, and thus the amount of information to be collected, processed, and possibly displayed, is extremely large. Thus, the amount of processing power required to collect and process that information is much larger than is available.

A first known method for collecting information about use of the network is to couple a monitoring processor to a link in the network, and to monitor traffic which passes through that link. For example, the monitoring processor could be coupled to a local-area network (LAN) coupled to a router, and could monitor traffic input to or output from that router using that LAN. A protocol known as "RMON" (remote monitoring) is known for transmitting messages relating to monitoring information between the monitoring processor and the router. However, this known method is subject to drawbacks, including (1) that the number of packets input to and output from the router usually greatly exceeds the capability of the monitoring processor to collect and process information about packets, and (2) that the monitoring processor is only able to collect and process information about packets which pass through that particular link.

A second known method for collecting information about use of the network is to couple the monitoring processor to the router using protocols at layer 3 of the OSI model, such as using the IP protocol to communicate between the monitoring processor and the router. The RMON protocol may also be used to transmit messages relating to monitoring information between the monitoring processor and the router in this configuration. However, this second method is subject to drawbacks, including that the monitoring processor is either not able to collect information from the router in sufficient detail, or if information is available in sufficient detail, that information greatly exceeds the capability of the monitoring processor to collect and process.

Accordingly, it would be desirable to provide a method and system for monitoring information about network usage. This advantage is achieved in an embodiment of the invention in which information about network usage is collected and aggregated in a network router responsive to flows in a flow switching network, and presented to monitoring processors for processing at a message flow level of aggregation.

SUMMARY OF INVENTION

The invention provides a method and system for exporting and using data relating to flows in a flow switching network and responsive to message flow patterns. In a preferred embodiment, the router collects flow history information, so that flows which are improper or otherwise unusual can be traced to the particular source and destination devices. The router also collects and aggregates flow information using a variety of criteria, including (1) ranges of addresses for source and destination, (2) information about packets in the flow, such as the number and frequency of the packets in the flow, the size of the packets in the flow (total size and distribution), (3) the protocol used for the flow, such as for example whether the flow uses an electronic mail protocol, a file transfer protocol, a hypertext transfer protocol, a real-time audiovisual data transmission protocol, or some other protocol, (4) other administrative criteria which may be pertinent to the flow, such as for example the time of initiation or duration of the flow, and (5) possible aggregations or combinations of these criteria.

In a preferred embodiment, the router provides the aggregated information to one or more filters at an output port. Each filter selects only a subset of the total set of flows; filters may be combined to create compound filters. Filters may be coupled to aggregators, which further aggregate flow data and may store flow data for use by application programs. Application programs may identify useful information in the flow data and may either (1) present that data to an operator for review, or (2) use that data to adjust features or parameters of the network.

DETAILED DESCRIPTION OF THE PREFERRED EMBODIMENT

Network Flow Switching and Message Flows

Figure 1:
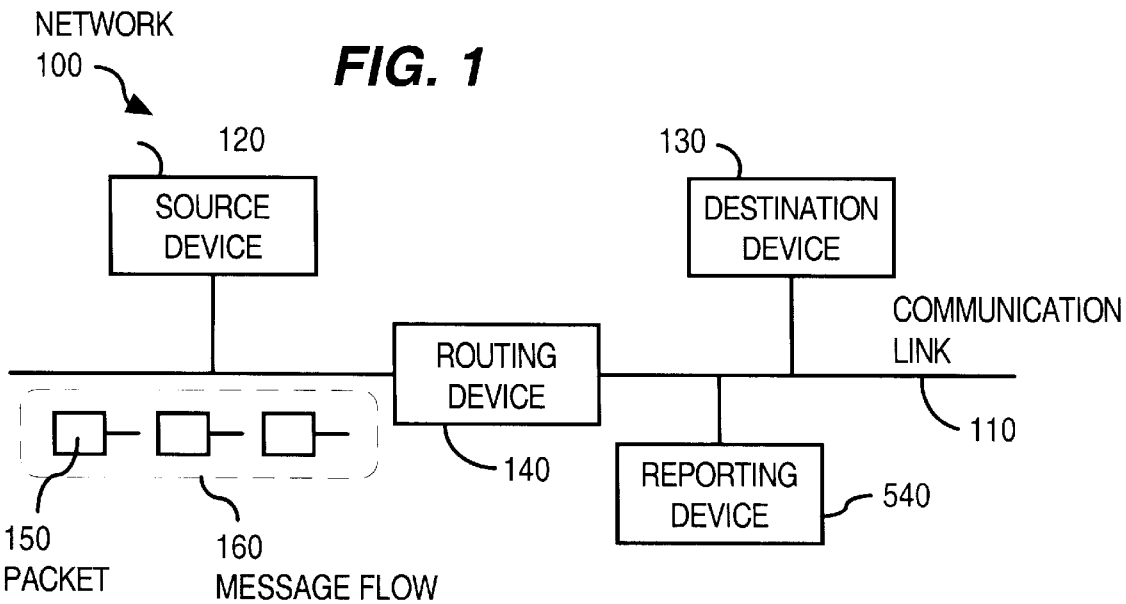
FIG. 1 shows an example network in which routing responsive to message flows is performed.

FIG. 1 shows an example network in which routing responsive to message flows is performed.

As described in the "network flow switching disclosure", a network 100 includes at least one communication link 110, at least one source device 120, at least one destination device 130, and at least one routing device 140. The routing device is disposed for receiving a set of packets 150 from the source device 120 and routing them to the destination device 130. The communication link may comprise any form of physical media layer, such as ethernet, FDDI, or HDLC serial link. The routing device 140 comprises a routing processor for performing steps described in the "network flow switching disclosure", and steps described herein, and may include specific hardware constructed or programmed for performing such process steps, may include a general purpose processor operating under program control, or some combination thereof.

As described in the "network flow switching disclosure", a message flow 160 consists of a unidirectional stream of packets 150 to be transmitted between particular pairs of transport service access points (thus, network-layer addresses and port numbers). In a broad sense, a message flow 160 thus refers to a communication "circuit" between communication endpoints. In a preferred embodiment, a message flow 160 is defined by a network-layer address for a particular source device 120, a particular port number at the source device 120, a network-layer address for a particular destination device 130, a particular port number at the destination device 130, and a particular transmission protocol type. For example, the transmission protocol type may identify a known transmission protocol, such as UDP, TCP, ICMP, or IGMP (internet group management protocol).

As described in the "network flow switching disclosure", in a preferred embodiment for use with a network of networks (an "internet"), the particular source device 120 is identified by its IP (internet protocol) address. The particular port number at the source device 120 is identified by either a port number which is specific to a particular process, or by a standard port number for the particular transmission protocol type. For example, a standard port number for the TCP protocol type is 6 and a standard port number for the UDP protocol type is 17. Other protocols which may have standard port numbers include the FTP protocol, the TELNET protocol, an internet telephone protocol, or an internet video protocol such as the "CUSeeMe" protocol; these protocols are known in the art of networking. Similarly, the particular destination device 130 is identified by its IP (internet protocol) address; the particular port number at the destination device 130 is identified by either a port number which is specific to a particular process, or a standard port number for the particular transmission protocol type.

It will be clear to those skilled in the art, after perusing this application and the "network flow switching disclosure", that the concept of a message flow is quite broad, and encompasses a wide variety of possible alternatives within the scope and spirit of the invention. For example, in alternative embodiments, a message flow may be bidirectional instead of unidirectional, a message flow may be identified at a different protocol layer level than that of transport service access points, or a message flow may be identified responsive to other factors. These other factors may include one or more of the following: information in packet headers, packet length, time of packet transmission, or routing conditions on the network (such as relative network congestion or administrative policies with regard to routing and transmission).

Filtering and Reporting of Flow Data

Figure 2:
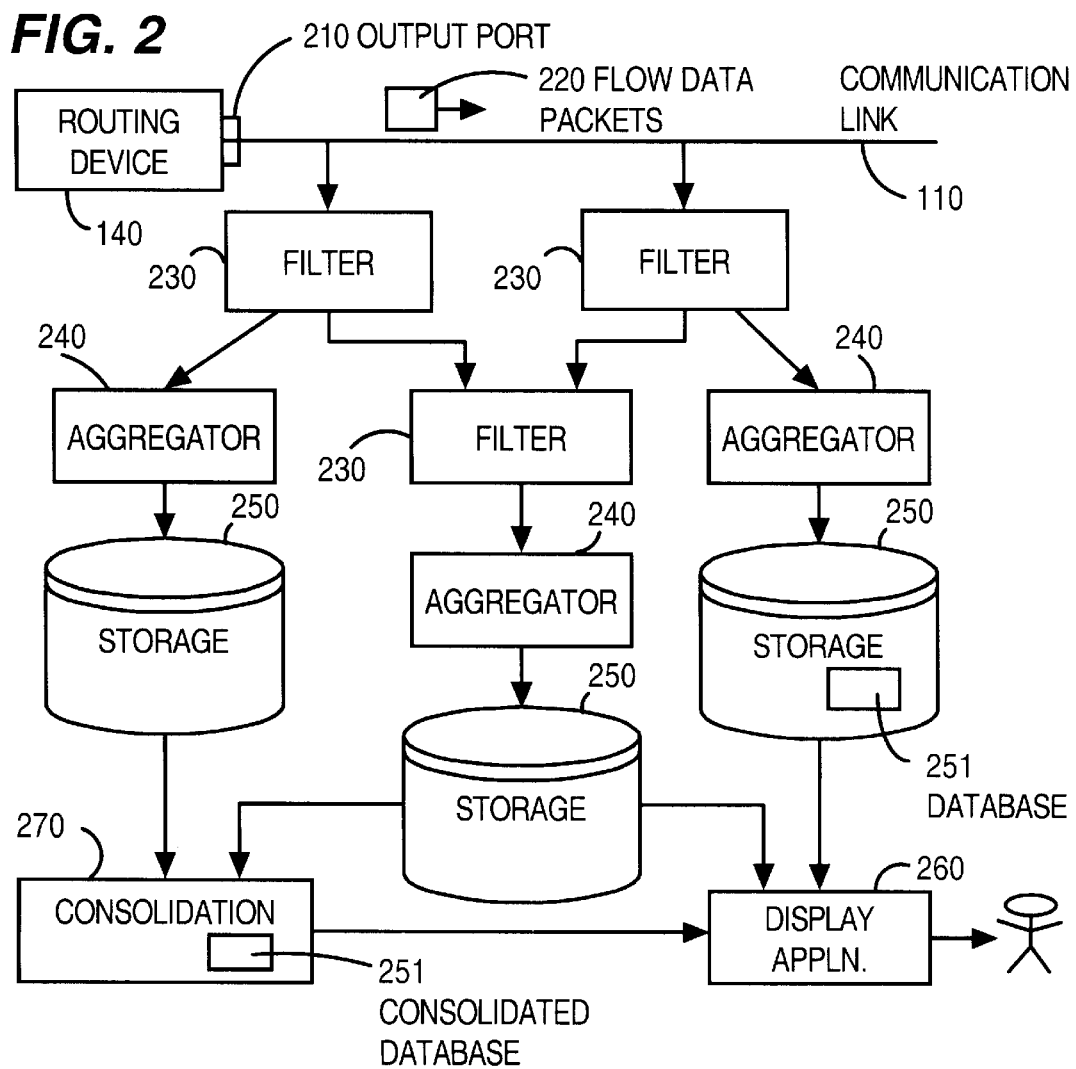
FIG. 2 shows an example network in which message flow information is filtered and reported.

FIG. 2 shows an example network in which message flow information is filtered and reported.

The routing device 140 includes an output port 210, at which the routing device 140 outputs flow data packets 220 comprising message flow information. The output port 210 is coupled to a communication link 110, to which devices may be coupled to receive the flow data packets 220.

A set of filters 230 (including at least one filter 230 and preferably a plurality of filters 230), are coupled to the communication link 110, and receive the flow data packets 220. Each of the filters 230 parses the flow data packets 220, and compares those flow data packets 220 with a set of selected criteria to determine if those flow data packets 220 should be considered or should be filtered out of consideration.

In a preferred embodiment, the set of selected criteria for one particular filter 230 includes a single criterion, although there is no particular reason (except perhaps speed) that one of the filters 230 cannot process more than one criterion simultaneously.

For a first example, a first one of the filters 230 can select flow data packets 220 which relate to message flows 160 having a selected range of source addresses, such as flow data packets 220 for message flows 160 which originate from the internet domain "cisco.com". For a second example, a second one of the filters 230 can select flow data packets 220 which relate to message flows 160 having a selected protocol type, such as flow data packets 220 for message flows 160 which use the "FTP" protocol.

A set of secondary filters 230 can each be coupled to a set of primary filters 230, and operate to compare flow data packets 220 with a further set of selected criteria. In a preferred embodiment, the secondary filters 230 can each be coupled to a plurality of primary filters 230, so as to operate on a set union of flow data packets 220 selected by each of the primary filters 230.

For example, in the embodiment shown in the figure, a first primary filter 230 operates to select flow data packets 220 which relate to message flows 160 having a selected range of source addresses, such as flow data packets 220 for message flows 160 which originate from the internet domain "cisco.com", while a second primary filter 230 operates to select flow data packets 220 which relate to message flows 160 having a selected protocol type, such as flow data packets 220 for message flows 160 which use the "FTP" protocol. A secondary filter 230 is coupled to both the first primary filter 230 and the second primary filter 230, and operates to select a subset of those flow data packets 220 selected by either the first primary filter 230 or the second primary filter 230.

The selection criteria applied by the secondary filter 230 are similar to the selection criteria applied by any of the primary filters 230; thus the secondary filters 230 are like the primary filters 230 except for being coupled to flow data packets 220 selected by the primary filters 230 rather than flow data packets 220 output by the routing device 140.

Similar to the secondary filter 230, there can be a tertiary filter 230 which selects flow data packets 220 from those selected by secondary filters 230, or by a combination of those selected by primary filters 230 and those selected by secondary filters 230, or by a combination of original flow data packets 220, those selected by primary filters 230 and those selected by secondary filters 230. There can similarly be fourth-level filters 230, and so on, to combine the filtering results of each set of filters 230.

An aggregator 240 is coupled to each of the filters 230, and collects flow data packets 220 passed by its associated filter 230. Thus, each of the aggregators 240 collects a set of flow data packets 220 which relate to the criteria selected by its associated filter 230 and records aggregated information relating to those flow data packets 220 at a storage element 250. The storage elements 250 record the aggregated information in one or more databases 251 located at those locations.

A display application 260 is coupled to one or more storage elements 250, accesses the databases 251, and provides a display of information for an operator. In a preferred embodiment, the operator can comprise an individual who uses the display application 260, or can comprise an application program which is coupled to the display application.

A consolidation element 270 is coupled to one or more storage elements 250 and operates to consolidate the databases 251 stored at those storage elements 250 to create a consolidated database 251. The display application 260 can be coupled to the consolidated database 251 instead of or as well as the individual databases 251, and can operate to display information in the consolidated database 251 instead of or as well as the individual databases 251.

Types of Display Applications

The display application 260 provides information to the operator gleaned from the database 251, such as the following:

The display application 260 can record accounting information, which can be used to charge users of the network 100 for their use. For example, users can be charged for network usage in response to total number of bytes, total number of packets, average transmission bandwidth, or peak transmission bandwidth.

Although individual message flows 160 are not identified with regard to particular users, individual message flows 160 can be identified with regard to particular source devices 120, which can in many cases be in turn identified with regard to particular users.

The display application 260 can record events deemed "interesting," such as attempts to violate access control lists, other security rules, or other administrative policies; initiation or use of particular protocols; or initiation of each message flow 160. For some applications it can be desirable to record initiation of every message flow 160. For relatively short message flows 160, the display application 260 can record the entire actual message flow 160 itself.

Although it might be difficult to determine for an individual message flow 160 whether or not that message flow 160 violates one or more administrative policies, it is possible to record particular information about each individual message flow 160 and to provide a secondary display application with that information so as to determine if any administrative policy has been violated.

The display application 260 can show state information about the network 100, including the frequency of packets, number of bytes, number of packets, and average size of packets transmitted on particular communication links 110. The display application 260 can distinguish this information by protocol type, by ultimate destination (such as whether the packets transmitted on a communication link 110 are destined for a destination device 130 coupled to that communication link 110, or are instead destined for a destination device 130 coupled to a different communication link 110 (by way of a routing device 140 coupled to that communication link 110).

State information about the network 100 can be used to determine whether particular communication links 110 are congested, are heavily used, are lightly used, or are even inoperative. Network administrators can use this information to determine which communication links 110 require maintenance and how often, and can use this information for capacity planning for the network 100.

Router Use of Exported Flow Data

The display application 260 is also coupled to the routing device 140 so as to provide the display results to the routing device 140 for altering, augmenting, or modifying the operation of the routing device 140. Thus, the display application 260 provides information to the routing device 140 for use in routing packets 150, such as the following:

The routing device 140 can use information from the display application 260 to attempt to balance transmission of packets 150 in the network 100 to avoid overloading busy communication links 110 or routing devices 140. Balancing transmission of packets 150 can be directed to raw measures of traffic throughput, such as total number of bytes, total number of packets, average transmission bandwidth, or peak transmission bandwidth, or can be directed to administrative policy modifications of those raw measures, such as assigning a dollar cost to particular resources or resource measures.

Naturally the router 140 can also use information from the display application 260 in conjunction with information available to the router 140 from the routing protocol it uses (such as IGRP or EIGRP).

The routing device 140 can use information from the display application 260 to attempt to balance transmission of packets 150 in the network 100 to achieve fairness among a plurality of users of the network 100. As with balancing transmission of packets 150, fairness among a plurality of users can be directed to raw measures of traffic throughput, such as total number of bytes, total number of packets, average transmission bandwidth, or peak transmission bandwidth, or can be directed to administrative policy modifications of those raw measures, such as assigning a dollar cost to particular resources or resource measures.

The measure of "fairness" to individual users can be adjusted to account for other administrative policies, such as adjusting pricing measures at different times of day, adjusting pricing measures in response to relative loading, granting greater access or preferential access to particular users or preferred classes of users, or granting greater access or preferential access to particular message flows 160 or preferred classes of message flows 160. For example, internet telephony could be granted preferential access on the grounds that it is a real time application; alternatively, internet telephony could have its access reduced in priority on the grounds that it generates excessive traffic.

The routing device 140 can use information from the display application 260 to achieve particular measures of quality of service or to prioritize different types of traffic, in response to relative loading of particular types of message flows 160.

For a first example, the routing device 140 can limit particular users to no more network bandwidth than paid for. For a second example, the routing device 140 can assign relative priorities to particular protocols used in message flows 160 in response to the amount of network bandwidth actually being used for those particular protocols.

The routing device 140 can use information from the display application 260 to enforce particular administrative rules for limiting network traffic or routing.

For a first example, the routing device 140 can limit use of particular protocols to no more than a selected fraction of network bandwidth (such as a limit of 10% of network bandwidth for HTTP transfers). For a second example, the routing device 140 can limit use of network bandwidth to particular destination devices 130 or can limit use of particular protocols within selected time period.

Naturally, the number of possible administrative policies is limited only by the imagination of administrators, so long as those administrative policies are responsive to information which can be collected and reported by the display application 260.

Breadth of Flow Data Export Concept

It will be clear to those skilled in the art, after perusing this application, that the concept of reporting information about message flows is quite broad, and encompasses a wide variety of possible alternatives within the scope and spirit of the invention. For example, in alternative embodiments, information about message flows may include bidirectional traffic information instead of unidirectional traffic information, information about message flows may include information at a different protocol layer level other than that of transport service access points and other than that at which the message flow is itself defined, or information about message flows may include actual data transmitted as part of the flow itself.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for exporting data responsive to patterns of message flows passing through a routing device of a network, said method including the steps of:
   receiving a plurality of packetized message flows defined by transport protocol fields and each comprising a plurality of sets of packets for a particular TCP or UDP transport connection traveling in a single direction on the network;
   collecting history information regarding the plurality of message flows at the routing device;
   filtering the message flows to result in selecting at least one subset of said message flows, wherein all message flows in the subset of message flows satisfy a selected criterion;
   aggregating the sub-plurality of message flows by creating and storing at least one set of aggregated message flow information that represents the subset of message flows in a database of a storage element for use by one or more external application programs; and
   tracing said history information to identify a source or a destination device for said subset of message flows.

2. A method as recited in claim 1, further comprising the steps of:
   automatically displaying through a display application program, based on the aggregated message flow information, accounting information pertaining to network usage for use in charging users of the network for their use.

3. A method as recited in claim 1, further comprising the steps of:
   automatically displaying through a network management application program, based on the aggregated message flow information, event information that identifies an attempt to violate a security policy as determined according to one or more administrative policies.

4. A system for exporting data responsive to message flow patterns, said system including
   means for receiving a message flow defined by transport protocol fields as a set of packets for a particular TCP or UDP transport connection traveling in a single direction on a network;
   means for collecting, from a router on the network, history information regarding a plurality of message flows, and for receiving a plurality of flow data packets of the message flows that are generated by the router;
   a filter coupled to said flow data packets that filters the message flows to result in selecting at least one subset of said message flows, wherein all message flows in the subset of message flows satisfy a selected criterion;
   an aggregator coupled to the filter and that aggregates the sub-plurality of message flows by creating and storing at least one set of aggregated message flow information that represents the sub-plurality of message flows in a database of a storage element for use by one or more external application programs; and
   means for tracing said history information to identify a source or a destination device for said selected message flow.

5. A system as recited in claim 4, further comprising means for communicating the stored aggregated message flow information to an application program for use in modifying a performance parameter of the router that improves performance of the router based on the aggregated message flow information.

6. A method for improving performance of a routing device in a network responsive to message flow patterns of messages passing through the routing device, said method including the steps of:
   receiving a plurality of message flows represented by transport protocol fields and each comprising a plurality of sets of packets for a particular TCP or UDP transport connection traveling in a single direction on the network;
   filtering the message flows to result in selecting at least one subset of said message flows, wherein all message flows in the subset of message flows satisfy a selected criterion;
   aggregating the sub-plurality of message flows by creating and storing at least one set of aggregated message flow information that represents the sub-plurality of message flows and occupies less storage than the sub-plurality of message flows in a database of a storage element for use by one or more external application programs; and
   communicating the stored aggregated message flow information to the routing device for use in modifying a parameter value of the routing device that results in improving performance of the routing device.

7. A method as recited in claim 6, wherein the step of communicating the stored aggregated message flow information to the routing device comprises the step of communicating the stored aggregated message flow information to the routing device for use in modifying a parameter value of the routing device that results in achieving fairness among a plurality of devices that communicate packets in the network with respect to an administrative policy selected from among: pricing according to time of day; pricing according to relative loading; granting greater or preferential access to particular users or preferred classes of users; or granting greater access or preferential access to particular message flows or classes of message flows.

8. A method as recited in claim 6, wherein the step of communicating the stored aggregated message flow information to the routing device comprises the step of communicating the stored aggregated message flow information to the routing device for use in modifying a parameter value of the routing device that results in achieving a particular quality of service treatment of the message flows.

9. A method as recited in claim 6, wherein the step of communicating the stored aggregated message flow information to the routing device comprises the step of communicating the stored aggregated message flow information to the routing device for use in modifying a parameter value of the routing device that results in prioritizing different types of message traffic, in response to relative loading of particular types of message flows on a communication link that is coupled to the routing device.

10. A method as recited in claim 6, wherein the step of communicating the stored aggregated message flow information to the routing device comprises the step of communicating the stored aggregated message flow information to the routing device for use in modifying a parameter value of the routing device that results in prioritizing different types of message traffic, in response to relative loading of particular protocols used in the message flows in response to an amount of network bandwidth actually being used for the protocols on a communication link that is coupled to the routing device.

11. A method as recited in claim 6, wherein the step of communicating the stored aggregated message flow information to the routing device comprises the step of communicating the stored aggregated message flow information to the routing device for use in modifying a parameter value of the routing device that results in limiting use of a particular protocol to no more than a selected fraction of network bandwidth for that protocol.

12. A computer-readable medium carrying one or more instructions for exporting data responsive to patterns of message flows passing through a routing device, which instructions, when executed by one or more processors, cause the one or more processors to carry out the steps of:
receiving a plurality of packetized message flows defined by transport protocol fields and each comprising a plurality of sets of packets for a particular TCP or UDP transport connection traveling in a single direction on the network;
collecting history information regarding the plurality of message flows at the routing device;
filtering the message flows to result in selecting at least one subset of said message flows, wherein all message flows in the subset of message flows satisfy a selected criterion;
aggregating the sub-plurality of message flows by creating and storing at least one set of aggregated message flow information that represents the sub-plurality of message flows in a database of a storage element for use by one or more external application programs; and
tracing said history information to identify a source or a destination device for said selected message flow.

13. A computer-readable medium carrying one or more instructions for improving performance of a routing device in a network responsive to patterns of message flows passing through the routing device, which instructions, when executed by one or more processors, cause the one or more processors to carry out the steps of:
receiving a plurality of message flows represented by transport protocol fields and each comprising a plurality of sets of packets for a particular TCP or UDP transport connection traveling in a single direction on the network;
filtering the message flows to result in selecting at least one subset of said message flows, wherein all message flows in the subset of message flows satisfy a selected criterion;
aggregating the sub-plurality of message flows by creating and storing at least one set of aggregated message flow information that represents the sub-plurality of message flows and occupies less storage than the sub-plurality of message flows in a database of a storage element for use by one or more external application programs; and
communicating the stored aggregated message flow information to the routing device for use in modifying a parameter value of the routing device that results in improving performance of the routing device.

14. A method for exporting data representing one or more message flows that pass through a routing device of a network, said method including the steps of:
receiving a plurality of packetized message flows defined by transport protocol fields, each of the flows comprising a plurality of sets of packets for a particular TCP or UDP transport connection traveling in a single direction on the network;
filtering the message flows using a first filter to result in selecting a first subset of said message flows, wherein all packets selected by the first filter for the first subset of message flows have the same originating domain value;
filtering the first subset of message flows using a second filter to result in selecting a second subset of said message flows, wherein all packets selected by the second filter for the second subset of message flows have the same protocol value;
aggregating the second subset of message flows by creating and storing first aggregated message flow information that represents the second subset of message flows in a database of a first storage element;
receiving the first aggregated message flow information from the first storage element at a display application program that computes one or more charges to one or more users of the network based on the first aggregated message flow information.

15. A method as recited in claim 14, further comprising the steps of:
filtering the first subset of message flows using a third filter to result in selecting a third subset of said message flows, wherein all packets selected by the third filter for the third subset of message flows satisfy a criterion other than those used by the first filter and second filter;
aggregating the third subset of message flows by creating and storing second aggregated message flow information that represents the third subset of message flows in a second storage element;
consolidating the first aggregated message flow information and the second aggregated message flow information in a consolidated database;
receiving consolidated message flow information from the consolidated database;
computing one or more charges to one or more users of the network based on the consolidated message flow information.

16. A network data flow export system configured to export data representing one or more message flows that pass through a routing device of a network, the system comprising:
a first filter that receives a plurality of packetized message flows defined by transport protocol fields, each of the flows comprising a plurality of sets of packets for a particular TCP or UDP transport connection traveling in a single direction on the network and that filters the message flows to result in selecting a first subset of said message flows, wherein all packets selected by the first filter for the first subset of message flows have the same originating domain value;

a second filter that filters the first subset of message flows to result in selecting a second subset of said message flows, wherein all packets selected by the second filter for the second subset of message flows have the same protocol value;

a first aggregator that aggregates the second subset of message flows by creating and storing first aggregated message flow information that represents the second subset of message flows in a database of a first storage element;

means for communicating the first aggregated message flow information from the first storage element to a display application program that computes one or more charges to one or more users of the network based on the first aggregated message flow information.

17. An apparatus as recited in claim 16, further comprising:

a third filter that filters the first subset of message flows to result in selecting a third subset of said message flows, wherein all packets selected by the third filter for the third subset of message flows satisfy a criterion other than those used by the first filter and second filter;

a second aggregator that aggregates the third subset of message flows by creating and storing second aggregated message flow information that represents the third subset of message flows in a database of a second storage element;

a consolidator that consolidates the first aggregated message flow information and the second aggregated message flow information in a consolidated database;

means for communicating the consolidated message flow information from the consolidated database to a display application program that computes one or more charges to one or more users of the network based on the consolidated message flow information.

* * * * *